(12) United States Patent
Abe et al.

(10) Patent No.: US 10,545,597 B2
(45) Date of Patent: Jan. 28, 2020

(54) DISPLAY DEVICE

(71) Applicant: Japan Display Inc., Minato-ku (JP)

(72) Inventors: Hiroyuki Abe, Minato-ku (JP); Kazune Matsumura, Minato-ku (JP); Naoki Miyanaga, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/145,505

(22) Filed: Sep. 28, 2018

(65) Prior Publication Data
US 2019/0102026 A1   Apr. 4, 2019

(30) Foreign Application Priority Data

Oct. 4, 2017   (JP) .................................. 2017-194202

(51) Int. Cl.
*G06F 3/041*   (2006.01)
*G06F 3/044*   (2006.01)
(Continued)

(52) U.S. Cl.
CPC ............ *G06F 3/0412* (2013.01); *G06F 3/044* (2013.01); *G06F 3/0416* (2013.01);
(Continued)

(58) Field of Classification Search
CPC ...... G06F 3/0412; G06F 3/0416; G06F 3/044; G06F 3/0445; G06F 3/0446; G06F 2203/04103; G06F 2203/04108; G09G 3/3648; G09G 3/3225; G09G 2310/0286; G09G 2310/08; G09G 2320/0238; G09G 2370/16; H04B 5/0081; H01L 27/323
See application file for complete search history.

(56) References Cited

U.S. PATENT DOCUMENTS

2010/0090975 A1* 4/2010 Nagata ................ G02F 1/13338
                                                      345/174
2014/0118299 A1* 5/2014 Wang .................... G06F 3/0416
                                                      345/174
(Continued)

FOREIGN PATENT DOCUMENTS

JP         2014-57243        3/2014
WO    WO 2014/038209 A1    3/2014

*Primary Examiner* — Tom V Sheng
(74) *Attorney, Agent, or Firm* — Oblon, McClelland, Maier & Neustadt, L.L.P.

(57) ABSTRACT

A display device having a Near Field Communication (NFC) function and a display panel installed with the touch panel function comprising: the common voltage is applied to all the display electrodes (Tx1 through Txn) during a display operation; the voltage for the touch panel is successively applied to the display electrodes during the touch panel operation; a first circuit, which changes between the display operation and the touch panel operation, is formed at a first side of the display area, a second circuit, which changes between the image display operation and the touch panel operation, is formed at a second side of the display area; the first circuit supplies the voltage for the touch panel to a selected display electrode and supplies the common electrode to other electrodes; the second switch circuit does not supply voltage to the selected display electrode and supplies the common voltage to other electrodes.

10 Claims, 11 Drawing Sheets

(51) Int. Cl.
  *G09G 3/36*    (2006.01)
  *H04B 5/00*    (2006.01)
  *G09G 3/3225*  (2016.01)

(52) U.S. Cl.
  CPC ......... *G09G 3/3648* (2013.01); *H04B 5/0081* (2013.01); *G09G 3/3225* (2013.01); *G09G 2310/0286* (2013.01); *G09G 2310/08* (2013.01); *G09G 2320/0238* (2013.01); *G09G 2370/16* (2013.01)

(56) References Cited

U.S. PATENT DOCUMENTS

| | | | |
|---|---|---|---|
| 2014/0292683 A1* | 10/2014 | Azumi | G06F 3/0412 345/173 |
| 2014/0375606 A1* | 12/2014 | Abe | G02F 1/13338 345/174 |
| 2015/0236401 A1 | 8/2015 | Yamaguchi et al. | |
| 2016/0334934 A1* | 11/2016 | Mo | G02F 1/13338 |
| 2016/0349888 A1* | 12/2016 | Huang | G06F 3/041 |
| 2017/0205928 A1* | 7/2017 | Noguchi | G06F 3/0412 |
| 2017/0242308 A1* | 8/2017 | Seki | G02F 1/13338 |
| 2017/0269748 A1* | 9/2017 | Ding | G02F 1/13338 |
| 2018/0032194 A1* | 2/2018 | Koide | G06F 3/0412 |
| 2018/0095576 A1* | 4/2018 | Yokoo | G02F 1/13338 |
| 2018/0300000 A1* | 10/2018 | Takada | G06F 3/044 |
| 2019/0025966 A1* | 1/2019 | Xing | G06F 3/0412 |

\* cited by examiner

DISPLAY DEVICE

CLAIM OF PRIORITY

The present application claims priority from Japanese Patent Application JP 2017-194202 filed on Oct. 4, 2017, the content of which is hereby incorporated by reference into this application.

BACKGROUND OF THE INVENTION

(1) Field of the Invention

The present invention relates to a display device, specifically to a display device that is installed with a touch panel function and a Near Field Communication (NFC) function.

(2) Description of the Related Art

Recently, display devices that include touch panel function for input means are increasing in the small size and the middle size liquid crystal display devices. One type of those displays is that a touch panel is formed separately from the display panel; then, the touch panel and the display panel are assembled. Another type is a so called in-cell touch panel where touch panel function is installed in the display panel. In the in-cell touch panel, the Rx electrodes (receiver electrodes) are formed outside of the counter substrate; the Tx electrodes (transfer electrodes) are formed inside of the TFT (Thin Film Transistor) substrate.

In the meantime, it has been put to practical use that a Near Field Communication (NFC) function is installed in a mobile terminal of the liquid crystal display device. The NFC enables to access to the digital contents or to connect with the instruments only by putting e.g. the liquid crystal display device having the NFC function near to the instruments.

The patent document 1 (Japanese patent laid open 2014-57243) and the patent document 2 (WO 2014/038209) describe the NFC technology.

SUMMARY OF THE INVENTION

The liquid crystal display device has a structure that the TFT substrate and the counter substrate oppose to each other and the liquid crystal layer is sandwiched between them; wherein the TFTs (Thin Film Transistor), the pixel electrodes, the counter electrodes, the scanning lines, and the video signal lines are formed on the TFT substrate.

In the in-cell touch panel, Rx electrodes (receiving electrodes) are formed outside of the counter substrate to extend in e.g. the same direction that the scanning lines extend (the lateral direction). In addition, the counter electrode, which is formed at the liquid crystal layer side of the TFT substrate, is divided to form the Tx electrodes (transferring electrodes), which extend in orthogonal to the direction that scanning lines extend (the longitudinal direction). The touch position is detected by measuring the static capacitance Ct formed between the Rx electrode and the Tx electrode.

In such a structure, the counter electrode has both a role of the common electrode in the liquid crystal display device and a role of the Tx electrodes in the touch panel. In the in cell touch panel system, one frame is divided into the display period and the touch panel period. Namely, the voltages being applied to the counter electrode must be switched. However, a noise is generated when this switching operation is made.

On the other hand, the liquid crystal display device compatible to the NFC, in which an NFC antenna is installed in the display device, communicates with the electrical instruments at close range. Therefore, if a noise is generated when the display operation is switched to the touch panel operation or when the touch panel operation is switched to the display operation, this noise causes malfunction of the NFC operation.

The purpose of the present invention is to countermeasure the malfunction of the NFC operation due to the noise, which is generated when the display operation is switched to the touch panel operation or when the touch panel operation is switched to the display operation, in the liquid crystal display device installed with the touch panel function and the NFC function.

The above problem has been explained taking an example of the liquid crystal display device; however, the same problem exists in the organic EL display device and the like, which the in cell touch panel function and the NFC function are installed.

The present invention overcomes the above explained problem; the concrete structures are as follows:

A display device having a Near Field Communication (NFC) function and a display panel installed with touch panel function comprising: a plurality of display electrodes are formed in a display area of the display panel, a first circuit having a plurality of first switches for changing between a voltage for an image display and for a touch panel operation, formed at a first side of the display area, a second circuit having a plurality of second switches for changing between applying the voltage for an image display and not applying the voltage for the image display at a second side opposite to the first side of the display area, the first circuit selects one of the plural display electrodes successively, applying the voltage for the touch panel operation to a selected display electrode and applying the voltage for the image display to the plurality of display electrodes other than the selected display electrode, the second circuit selects one of the plural display electrodes successively, and not applying the voltage for the image display to the selected display electrode.

DETAILED DESCRIPTION OF THE PREFERRED EMBODIMENTS

The present invention will be described in detail referring to the following embodiment. The following explanations are made in an example of the liquid crystal display device; however, the explanation is applicable to the organic EL display device and the like, in which the in cell touch panel function and the NFC function are installed.

Embodiment 1

Figure 1:
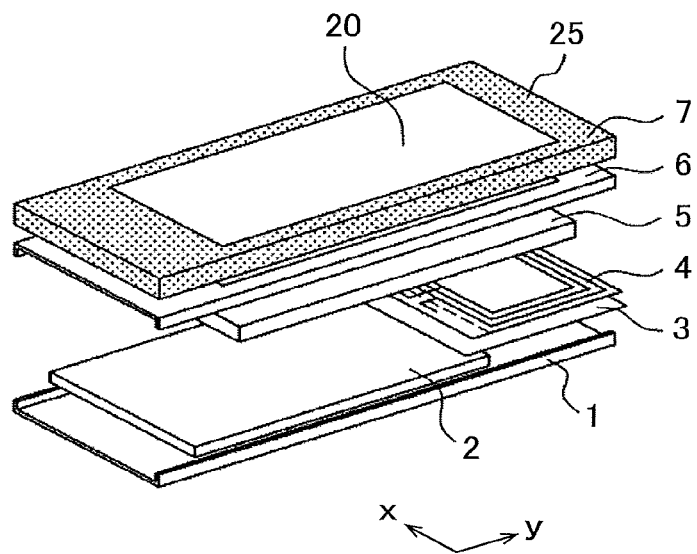
FIG. 1 is an exploded perspective view of the liquid crystal display device according to the present invention.

FIG. 1 is an example of an exploded perspective view of the liquid crystal display device according to the present invention. The liquid crystal display device in FIG. 1 has functions of the image display, the touch panel, and the NFC. In FIG. 1, the touch panel function is installed in the liquid crystal display panel 6. The protection glass 7 is disposed over the liquid crystal display panel 6. The frame like light shielding area 25 is formed outside of the display area 20 of the protection glass 7. The back light 5 is disposed at the rear of the liquid crystal display panel 6.

The antenna 4 for the NFC is disposed underneath of the back light 5. The NFC operates in the frequency band having 13.56 MHz as the center frequency to transfer data between the liquid crystal display device and other electronical instruments. The circuit substrate 2 is disposed under the NFC antenna 4; the circuit substrate 2 includes the circuits or a battery to make work whole of the liquid crystal display device. Since the NFC utilizes the electro-magnetic induction, the magnetic sheet 3 is disposed between the NFC antenna 4 and the circuit substrate 2 to prevent interference between the circuit substrate 2 and the antenna 4. All of those components are contained in the metal frame 1. The electro-magnetic wave radiates in the direction toward the liquid crystal display panel 6.

Figure 2:
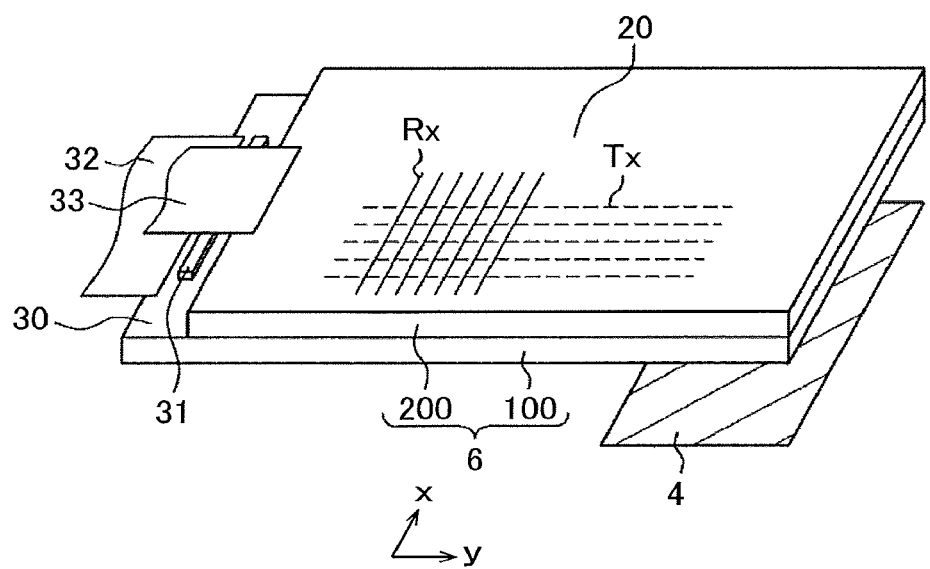
FIG. 2 is a perspective view of the liquid crystal display panel.

FIG. 2 is a perspective view of the liquid crystal display panel 6. In FIG. 2, the counter substrate 200 is disposed over the TFT substrate 100. The TFT substrate 100 and the counter substrate 200 are adhered to each other by the sealing material; the liquid crystal is sandwiched between the TFT substrate 100 and the counter substrate 200. The display area 20 is formed at the area that the TFT substrate 100 and the counter substrate 200 overlap.

The TFT substrate 100 is made bigger than the counter substrate 200; the terminal area 30 is formed in the area that the TFT substrate 100 and the counter substrate 200 do not overlap. The driver IC 31, which drives the liquid crystal display panel 6, is installed on the terminal area 30; the flexible wiring substrate 32 is connected to the terminal area 30 to supply signals to the liquid crystal display panel 6 and the driver IC 31.

In FIG. 2, the Rx electrodes for the touch panel are formed on the major surface of the outer side of the counter substrate 200. The Rx electrodes extend in the x direction and are arranged in the y direction. The flexible wiring substrate 33 for the touch panel connects to the counter substrate 200 to connect the Rx electrodes and the touch panel driving circuit.

The Tx electrodes for the touch panel are formed on the surface of the TFT substrate 100 that faces the liquid crystal layer. The Tx electrodes extend in the y direction and are arranged in the x direction. The Tx electrodes are formed by dividing the counter electrode of the liquid crystal display panel 6. Namely, the counter electrode has a role as the common electrode for the image display and a role as the Tx electrodes of the touch panel in the liquid crystal display panel 6.

In FIG. 2, the antenna 4 for the NFC is set under the liquid crystal display panel 6 and opposite side to the terminal area 30. The electromagnetic wave from the antenna 4 radiates in the direction toward the liquid crystal display panel 6. Therefore, if a source of noise exists near the side opposite to the terminal area 30, a malfunction of the NFC tends to occur.

Figure 3:
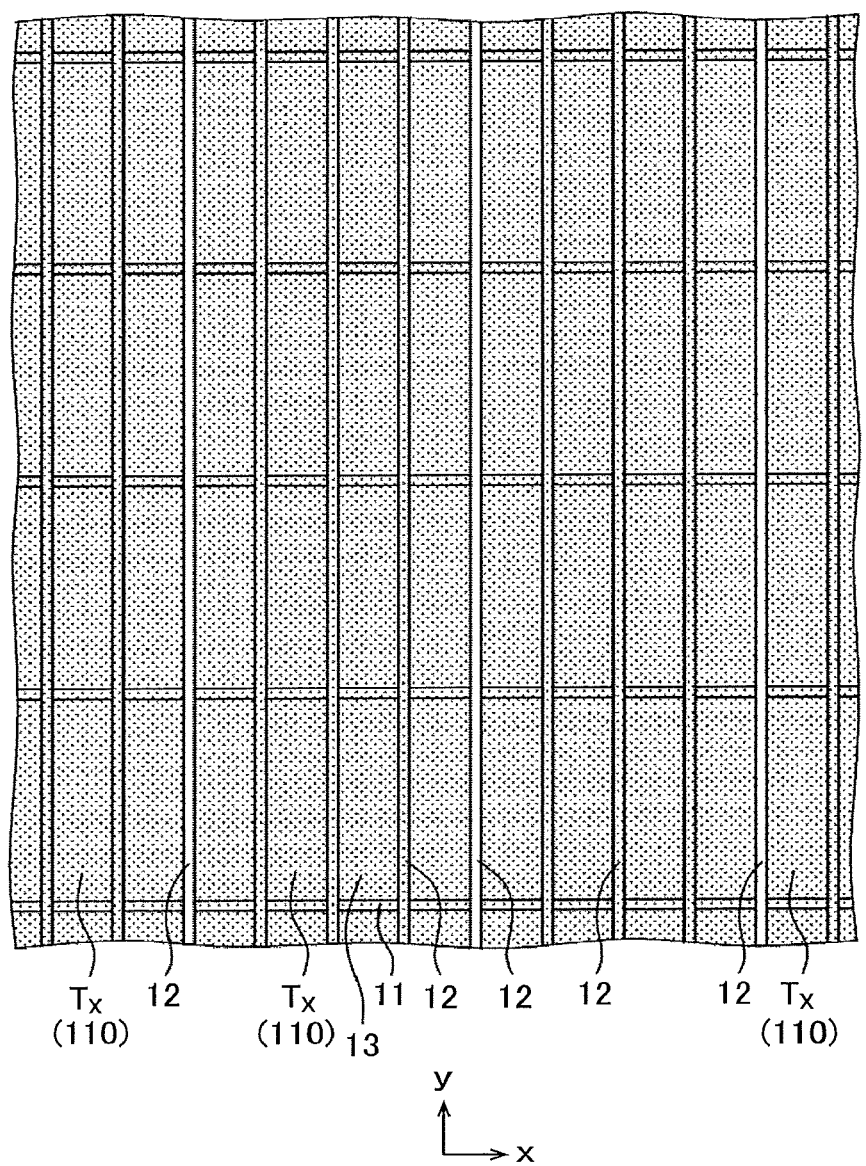
FIG. 3 is a plan view of the layout of the display area when the common electrode is used as electrodes of one side of the touch panel.

FIG. 3 is a plan view of the TFT substrate 100. In FIG. 3, the scanning lines 11 extend in the x direction and are arranged in the y direction; the video signal lines 12 extend in the y direction and are arranged in the x direction. The pixel 13 is formed in the area surrounded by the scanning lines 11 and the video signal lines 12. The pixel electrode, the TFT, and the through hole to connect the pixel electrode and the TFT are formed in the pixel 13.

In FIG. 3, the counter electrode 110 is formed in a plurality of pixels in common. In the normal liquid crystal display device, the counter electrode 110 is formed in common for all of the pixels; in the in cell touch panel type, however, the counter electrode 110 is divided so that it also can function as Tx electrodes. In FIG. 3, the stripe of the Tx electrode, which has a width of four pixels, extends in the y direction.

In FIG. 3, the width of the Tx electrode is a width of summation of four pixels in the X direction; however, number of the pixels in width direction can be bigger or smaller according to a necessity of the resolution of the touch panel. Generally, the video signal line 12 forms a boundary between the pixels 13; in addition to that, in FIG. 3, the narrow stripe shaped region, where the counter electrode 110 does not exist, extends over the video signal line 12 in every four pixels. The Tx electrodes are insulated to each other at this narrow stripe shaped region where the common electrode does not exist.

The counter electrode 110 of FIG. 3 has a role of a common electrode for the image display and a role of the Tx electrodes in the in cell touch panel. In concrete, one frame is divided into the display period and the touch panel period: in the display period, the common voltage Vcom is applied to the counter electrode 110; in the touch panel period, the transfer voltages (Tx voltage) for touch panel operation are applied successively to each of the Tx electrodes.

Figure 4:
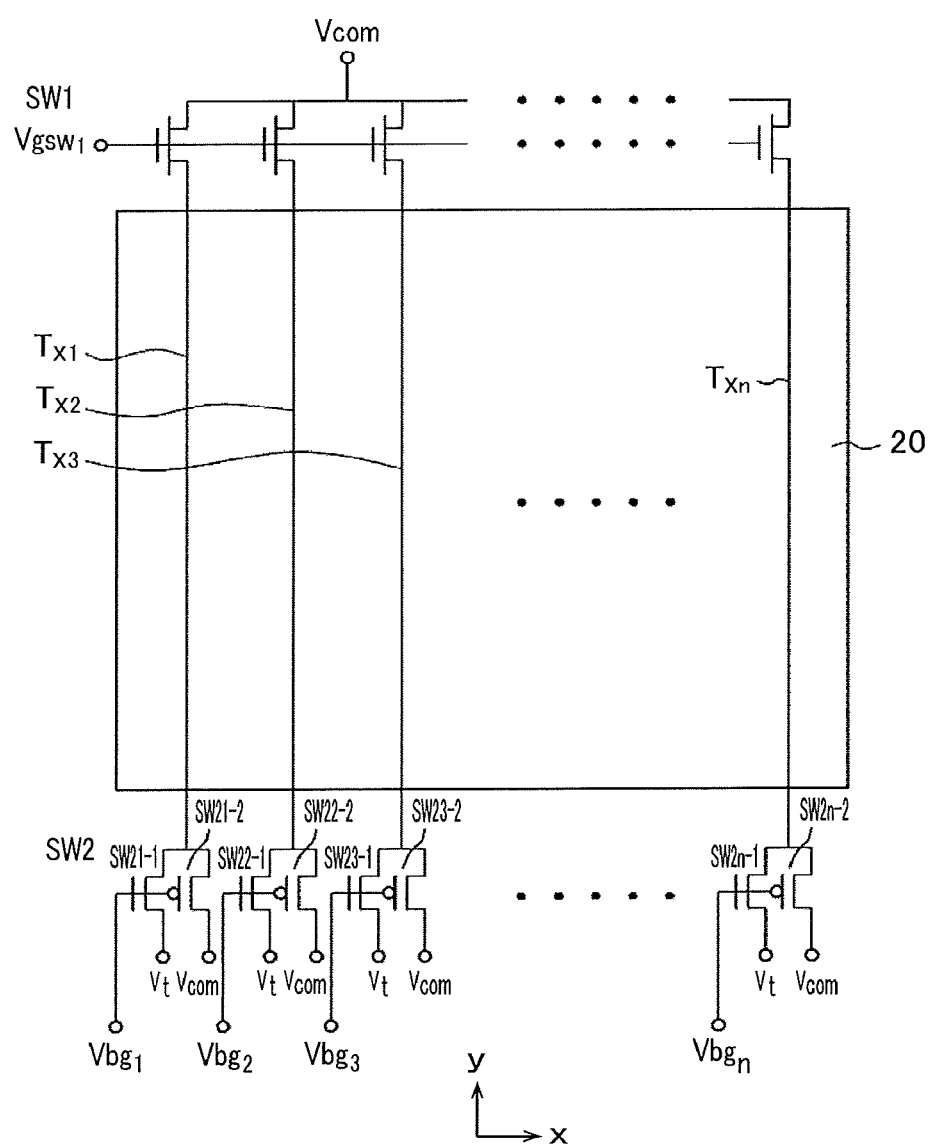
FIG. 4 is an equivalent circuit as the comparative example when the present invention is not used.
Figure 5A:
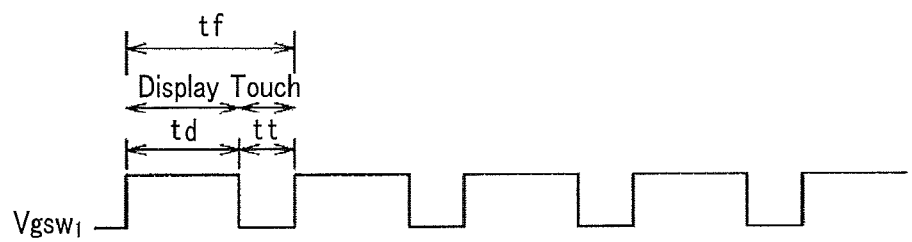
FIG. 5A is an example of the timing of the gate voltage that changes between the display operation and the touch panel operation.
Figure 5B:
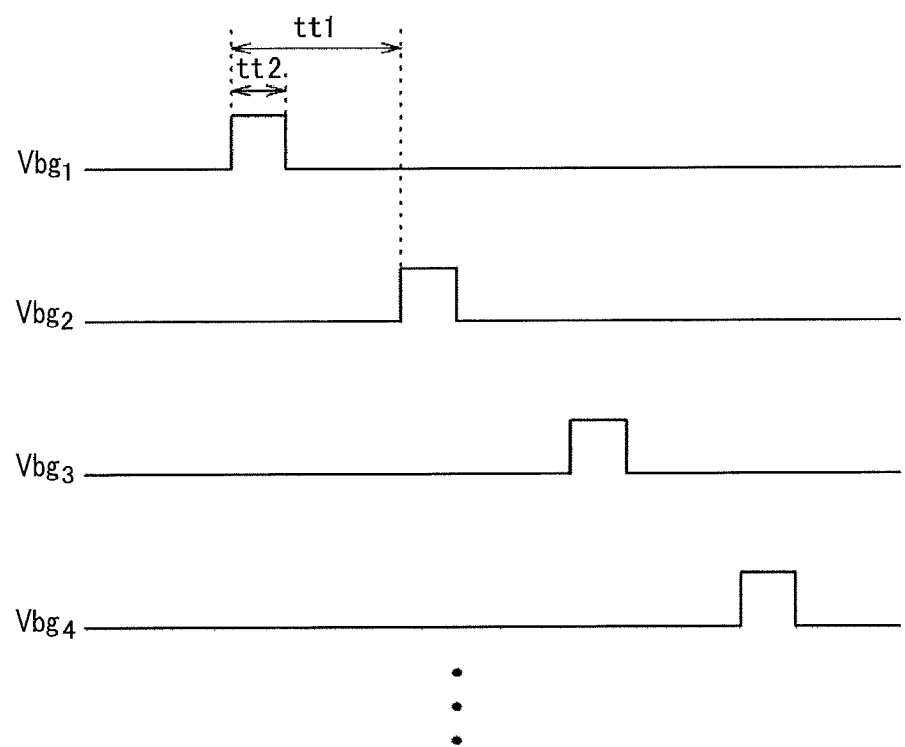
FIG. 5B is an example of the timing of the gate voltage that controls supplying voltages to the Tx electrode for the touch panel operation.

FIG. 4 is an equivalent circuit that shows this function. FIGS. 5A and 5B are timing charts that correspond to FIG. 4. In FIG. 4, n lines of Tx electrodes extend in the y direction in the display area 20. The number n is e.g. 35. The Tx electrodes are formed by dividing the counter electrode 110. Various circuits are installed in the liquid crystal display device; however, in FIG. 4, the circuits that do not directly relate to the present invention are not shown. The following drawings are also the same.

In FIG. 4, the first selector switch SW1, which supplies a common voltage Vcom to each of the Tx electrodes, is disposed at the upper side of the display area 20. The first selector switch SW1 is constituted by N type TFT array to connect to each of the Tx electrodes. Each of the TFTs that constitute the first selector switch SW1 is switched simultaneously by the voltage Vgsw1.

FIG. 5A is a timing chart of Vgsw1. In FIG. 5A, The period tf of one frame is divided into the period td of the image display period and the period tt of the touch panel operation. The periods are e.g. td:tt=2:1. The gate voltage Vgsw1 is High during the period td, and is Low during the period tt. In FIG. 4, when the Vgsw1 is High, all the TFTs of the first selector switch SW1 become ON, consequently, the common voltage Vcom is supplied to all the Tx electrodes; on the other hand, when the Vgsw1 is Low, the common voltage Vcom, which is to be supplied from the upper side of the display area, is cut off.

Back to FIG. 4, the second selector switch SW2 is disposed at the lower side of the display area 20. The second selector switch SW2 comprises pairs of switches of SW2n-1 and SW2n-2; in each of the pairs, the two switches are connected in parallel. Each of the pair of switches of SW2n-1 and SW2n-2 is connected to each of the Tx electrodes. The voltage Vt for touch panel operation is supplied to the source electrode of the TFT switch SW21-1; the drain of the TFT switch SW21-1 is connected to the Tx electrode. On the other hand, the common voltage Vcom for image display is supplied to the source electrode of the TFT switch SW21-2; the drain of the TFT switch SW21-2 is connected to the Tx electrode commonly with the TFT switch SW21-1.

The gate electrodes of SW21-1 and SW21-2 are commonly supplied with e.g. the gate voltage Vbg1. Each of similar pairs e.g. SW22-1 and SW22-2 through SW2n-1 and SW2n-2 in the second selector switch SW2 is connected to each of the electrodes Tx1 through Txn as the same manner as the pair of SW21-1 and SW21-2. The gate voltages Vbg1 through Vbgn are successively applied to the gate electrodes of each pairs of the second selector switch SW2.

The operation is explained taking an example of the left most pair of SW21-1 and SW21-2. The SW21-1 is comprised of N type TFT, while the SW21-2 is comprised of P type TFT. The voltage Vt for the touch panel is applied to the source of the SW21-1; The common voltage Vcom is applied to the source of the SW21-2.

When the gate voltage Vbg1 becomes High, the switch SW21-1 becomes ON, at the same time, the switch SW21-2 becomes OFF. Consequently the voltage Vt is applied to the electrode Tx1. When the gate voltage Vbg1 becomes Low, the switch SW21-1 becomes OFF, at the same time, the switch SW21-2 becomes ON. Consequently the common voltage Vcom is applied to the electrode Tx1. The functions of the second pair from the left and subsequent pairs, namely, pairs of SW2n-1 and SW2n-2, are the same as explained for the pair of the switch SW21-1 and SW21-2.

FIG. 5B is a timing chart of the gate voltages that are applied to each of the switching pairs in the touch panel operation period tt in the second selector switch SW2. The gate voltages Vbg1 through Vbgn are applied to the switches in the second selector switch SW2 in synchronizing with the selector switch SW1 at the upper side of the display area 20. Namely, in a timing that the selector switch SW1 at the upper side of the display area becomes OFF, one of the gate voltages of Vbg1, Vbg2, Vbg3 and so on are successively applied to the switch pairs in the second selector switch SW2; consequently, the touch panel voltage Vt is applied to the selected electrode Tx. The pulses Vbg1, Vbg2, Vbg3 and so on are formed by the shift register.

Each of the electrodes of Tx1, Tx2, Tx3 and so on depicted in FIG. 5B are selected once or plural times in one frame period; all the electrodes of Tx1 to Txn are selected successively. The period tt1 of the selecting pulse and the width tt2 of the selecting pulse in FIG. 5B can be changed according to how many times the electrodes of Tx1, Tx2, Tx3 and so on are selected in one frame period.

By the way, in FIG. 4, during the voltage Vt is applied to the electrode Tx1 for the touch panel operation, the gate voltages Vbg2 through Vbgn are low. Therefore, the common voltage Vcom is applied to the electrode Tx2 through Tx3; thus, black can be displayed; consequently, the contrast of the screen is not deteriorated.

The operation of FIG. 4, however, has the following problems. In FIG. 4, when a change is made by the switch SW1 between the image display period td and the touch panel period tt, the ON or OFF of the common voltage Vcom is applied to all of n lines of the Tx electrodes all at once. A large noise is generated when a change of ON or OFF of the common voltage Vcom occurs in all the n lines of Tx electrodes simultaneously. This large noise is generated every time when the change is made between the image display period td and the touch panel period tt.

Figure 6:
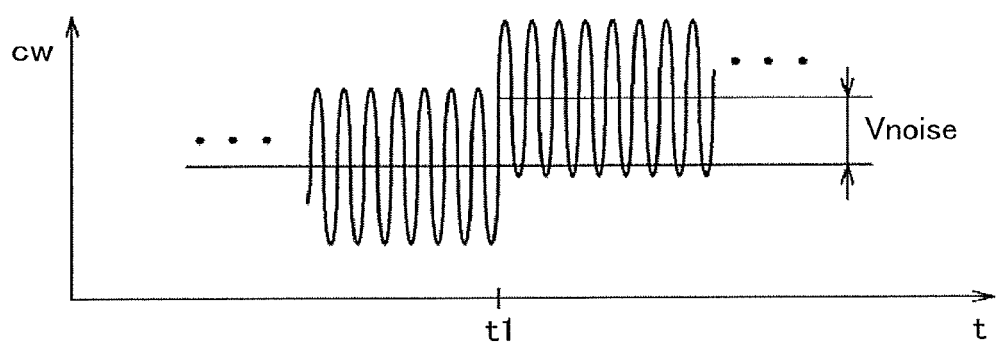
FIG. 6 is an example of NFC signals when the present invention is not used.

In the display device installed with the NFC, this noise is superimposed to the carrier wave cw of the NFC; consequently, it becomes a cause of malfunction of the NFC. The sin wave in FIG. 6 is a carrier wave for the NFC signal; the frequency of the carrier wave is e.g. 13.56 MHz. In FIG. 6, the ordinate is a value of the carrier wave cw; the abscissa is the time t. When the common voltage Vcom is cut off from each of the Tx electrodes by the first selecting switch sw1 at the time t1, the noise of Vnoise is generated, the carrier wave is modulated by the noise of Vnoise. Namely, as depicted in FIG. 6, the center of the sin wave shifts by a magnitude of Vnoise; this can be a cause of malfunction of the NFC.

Figure 7:
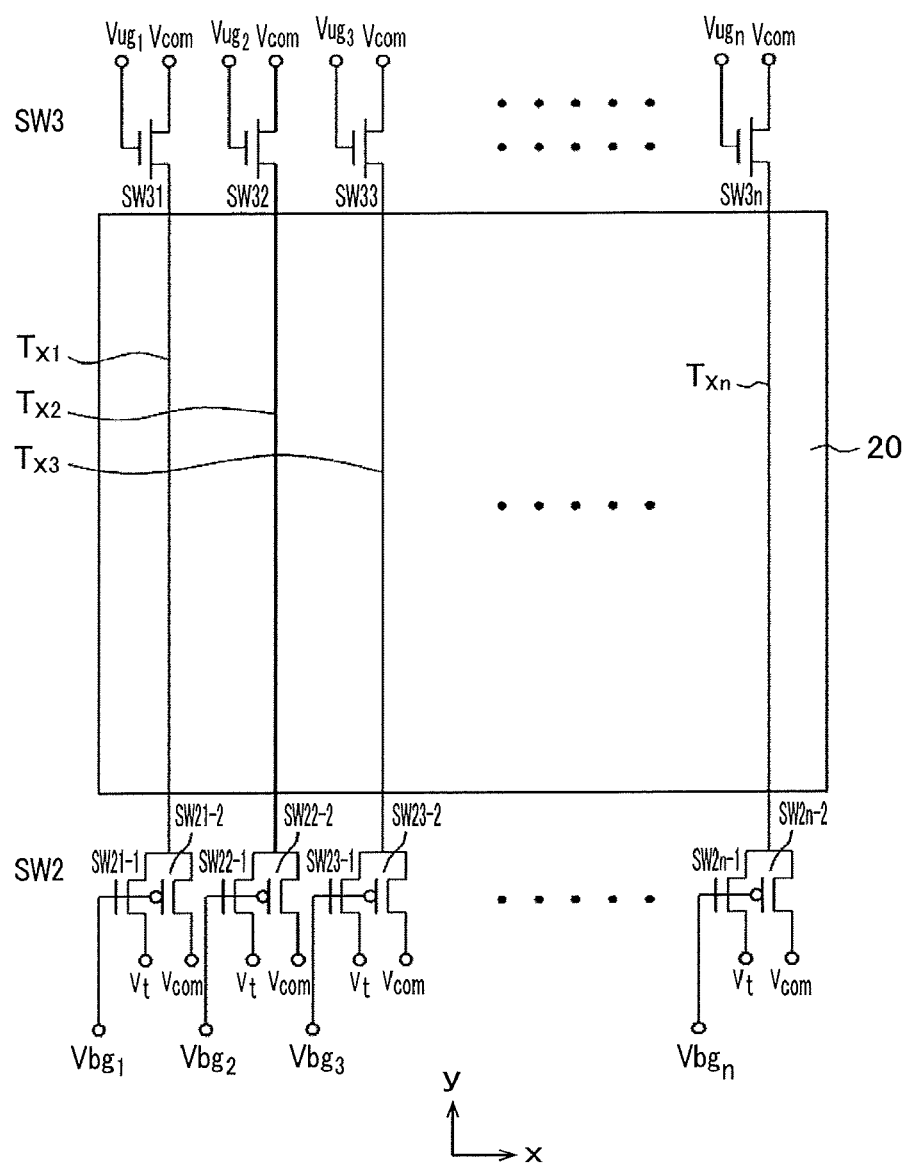
FIG. 7 is an equivalent circuit that shows the function of the present invention.

FIG. 7 is an equivalent circuit of the present invention. The structure of the display area in FIG. 7 is the same as the display area in FIG. 4. Namely, n lines of the Tx electrodes extend in the y direction and are arranged in the x direction. The second selector switch SW2 is disposed at the lower side in the y direction of the display area 20. The structure and the function of the second selector switch SW2 are the same as FIG. 4.

In FIG. 7, the third selector switch SW3 is disposed at the upper side in the y direction of the display area 20. The third selector switch SW3 is different from the first selector switch SW1 of FIG. 4. The third selector switch SW3 is comprised of the TFT array of N type TFTs of SW31 through SW3n. Each of the sources of SW31 through SW3n connects with Vcom; the drains of SW31 through SW3n connect with the Tx electrodes Tx1 through Txn.

The voltages Vug1, Vug2, . . . , Vugn are successively applied to the gates of SW31, SW32, SW33, . . . , SW3n. Each of pulse voltages of Vug1, Vug2, . . . , Vugn is supplied from the shift register. Since SW3 is constituted by N type TFT, the common voltage Vcom is cut off from the Tx electrodes Tx1 through Txn when the voltages of Vug1, Vug2, . . . , Vugn become Low.

Figure 11:
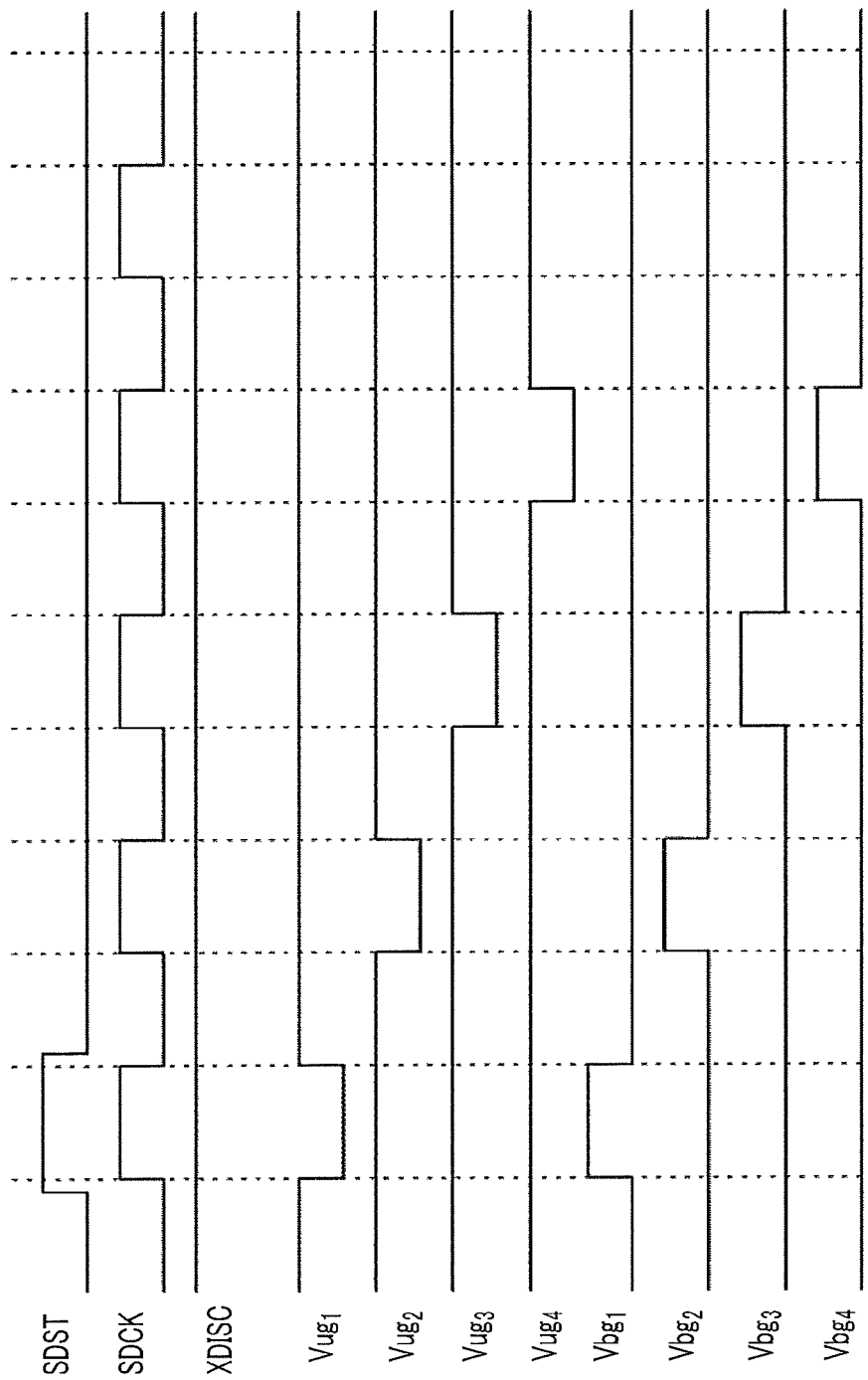
FIG. 11 is a timing chart according to the present invention.

On the other hand, the function of the second selector switch SW2, which is disposed at the lower side in the y direction of the display area 20 in FIG. 7, is the same as the SW2 of FIG. 4. In FIG. 7, the voltages Vug1, Vug2, . . . , Vugn are applied in synchronized with the voltages Vbg1, Vbg2, . . . , Vbgn respectively. FIG. 11 shows the timing chart that shows the relation between the voltages Vug1, Vug2, . . . , Vugn and the voltages Vbg1, Vbg2, . . . , Vbgn.

Namely, in regard to a certain Tx electrode, when the common voltage Vcom is cut off in the SW3, which is disposed at the upper side in the y direction of the display area 20, the SW2, which is disposed at the lower side in the y direction of the display area 20, becomes ON at the same time; consequently, the Tx voltage Vt is applied to the Tx electrode. The feature of FIG. 7 is that: when the change between the display period td and the touch panel period tt is made by the switch SW3, which is located at the upper side of the display area 20, the ON or OFF of the common voltage Vcom is not applied to all the Tx electrodes at once; however, the ON or OFF of the common voltage Vcom is applied only to the Tx electrode that the Tx voltage is applied. Therefore, the noise, generated in the switch SW3 of FIG. 7, becomes 1/n of the noise, generated in the switch SW1 of FIG. 4; thus, malfunction of the NFC can be avoided.

Figure 8:
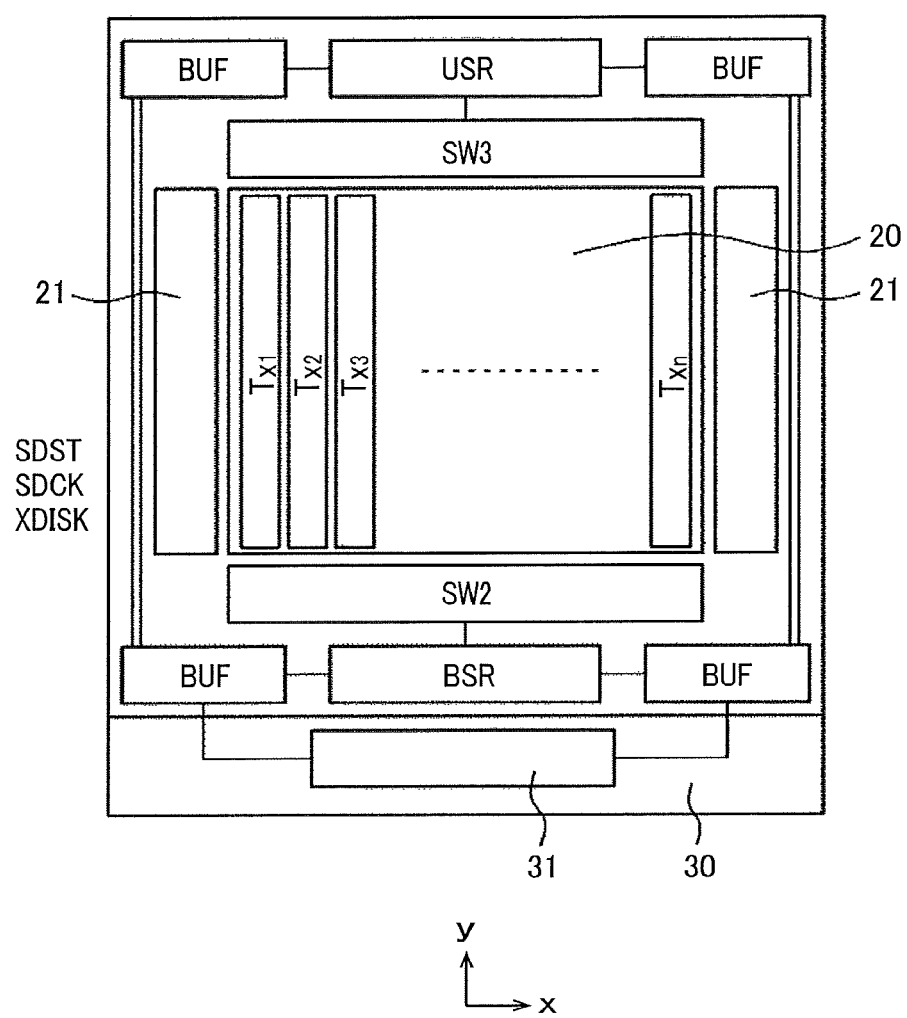
FIG. 8 is a plan view of the layout of the liquid crystal display device according to the present invention.

FIG. 8 is a plan view of the TFT substrate that shows concrete layout of the FIG. 7. The scanning line driving circuits 21 are located at both sides of the display area 20. The third selector switch SW3 and the upper shift register USR that supplies selecting signals to the third selector switch SW3 are located at the upper side of the display area 20. BUF is a buffer amplifier for the signals that are input to the shift register USR. The second selector switch SW2 and the lower shift register BSR that supplies selecting signals to the second selector switch SW2 are located at the lower side of the display area 20.

In FIG. 8, the electrode Tx1 through the electrode Txn serving as the counter electrodes 110 extend in the y direction and arranged in the x direction in the display area 20. The electrodes Tx1 through Txn are spread all over the display area 20. The common voltage Vcom is applied to all the electrodes Tx1 through Txn during the display period. On the other hand, either one of the electrodes Tx1 through Txn are selected to be applied with the Tx voltage during the touch panel operation; the common voltage Vcom is applied to the other Tx electrodes that are not selected. All the electrodes of Tx1 through Txn are selected once or plural times in one frame period.

As shown in FIG. 2, the liquid crystal display panel comprises the TFT substrate 100 and the counter substrate 200. The scanning line driving circuit 21, the third selector switch SW3, the upper shift register USR, the second selector switch SW2, and the lower shift register BSR are disposed in the area where the TFT substrate 100 and the counter substrate 200 overlap. The TFT substrate 100 is made bigger than the counter substrate 200; the region of the TFT substrate 100, where the counter substrate 200 does not overlap the TFT substrate 200, is a terminal area 30; the driver IC 31 is installed in the terminal area 30. The driver IC 31 supplies the start signal SDST, the clock signal SDCK, the reset signal XDISC and so on, which control the upper shift register USR, the lower shift register BSR and so on. In the meantime, the driver IC 31 supplies the video signals that constitute the images.

Figure 9:
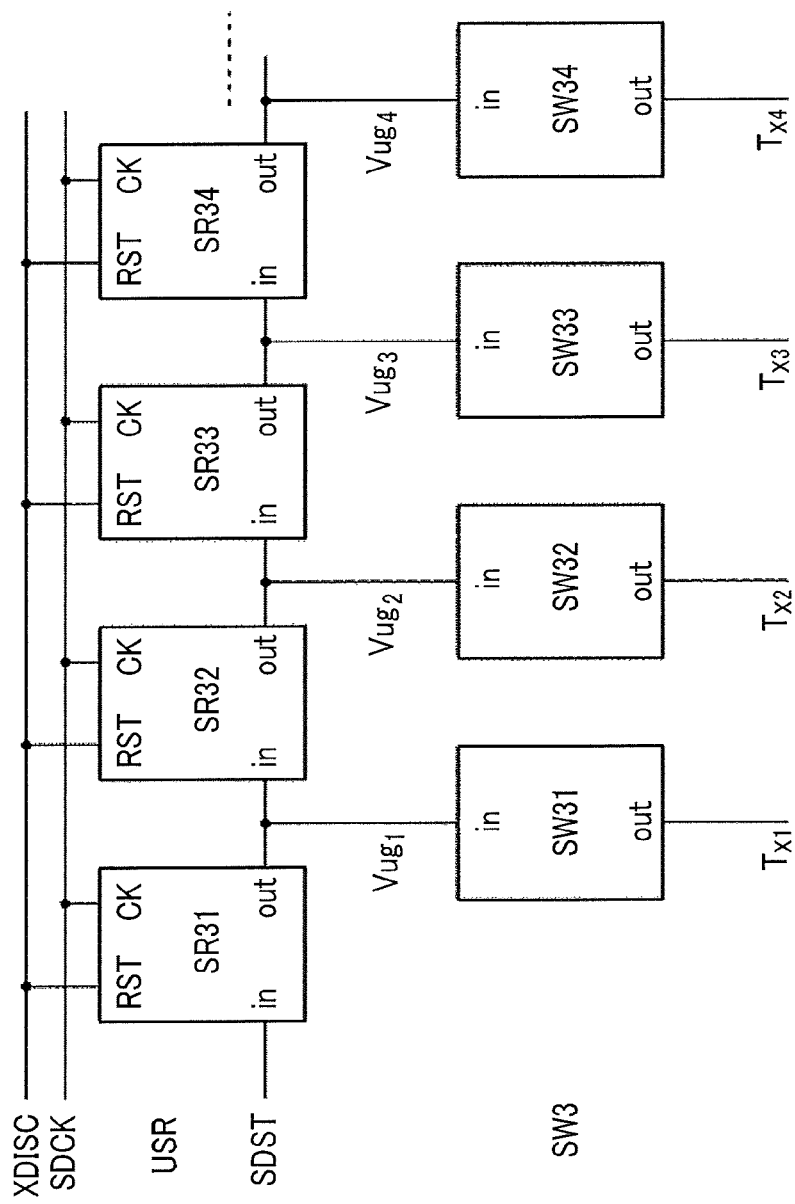
FIG. 9 is a third switch circuit diagram that shows the third shift register and the third selector switch.

FIG. 9 is a circuit of the third selector switch SW3 and the upper shift register USR that controls the third selector switch SW3. In FIG. 9, the number of the shift register units SR31 through SR3n is the same as the number of the Tx electrodes. The signals Vug1 through Vugn, which drive the third switch SW3, are supplied from the output terminal of each of the shift register units SR31 through SR3n. Each of the output terminals of the switches SW31 through SW3n in the third selector switch SW3 connects with each of the electrodes of Tx1 through Txn.

In FIG. 9, XDISC is a reset signal, which determines operating state or non-operating state of the shift register USR. SDCK is a clock signal, which determines a timing of the operation of the shift register USR. In FIG. 9, when the start signal SDST is applied to the first shift register unit SR31, the voltage Vug1 is supplied to the third selector switch SW31 from the first shift register unit SR31.

The output from the first shift register unit SR31 is the in-put to the second shift register unit SR32. The voltage Vug2 is supplied to SW32 of the third selector switch SW3 from the second shift register unit SR32. The output from the second shift register unit SR32 is the in-put to the third shift register unit SR33. As the same token, the switch signals Vug1 through Vugn are successively supplied to the third selector switch of SW31 through SW3n.

Figure 10:
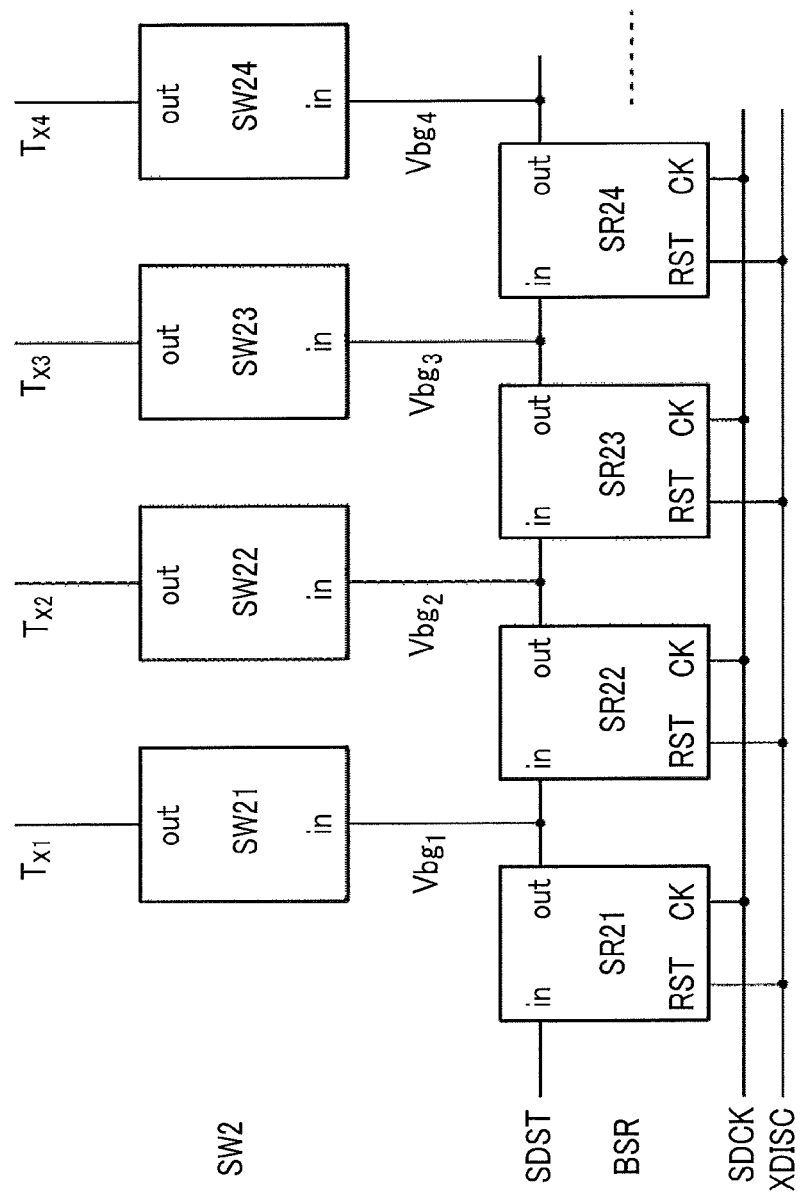
FIG. 10 is a second switch circuit diagram that shows the second shift register and the second selector switch.

FIG. 10 is a circuit of the second selector switch SW2 and the lower shift register BSR that controls the second selector switch SW2. In FIG. 10, the number of the shift register units SR21 to SR2n is the same as the number of the Tx electrodes. The signals Vbg1 through Vbgn, which drive the second selector switch SW2, are supplied from the output terminal of each of the shift register units of SR21 through SR2n. Each of the output terminals of the switches SW21 through SW2n in the second selector switch SW2 connects with each of the electrodes of Tx1 through Txn.

In FIG. 10, XDISC is a reset signal, which determines operating state or non-operating state of the shift register BSR. SDCK is a clock signal, which determines a timing of the operation of the shift register USR. In FIG. 10, when the start signal SDST is applied to the first shift register unit SR21, the voltage Vbg1 is supplied to the second selector switch SW21 from the first shift register unit SR21.

The output from the first shift register unit SR21 is the in-put to the second shift register unit SR22. The voltage Vbg2 is supplied to SW22 of the second selector switch from the second shift register unit SR22. The output from the second shift register unit SR22 is the in-put to the third shift register unit SR23. As the same token, the switch signals Vbg1 through Vbg2n are successively supplied to the switches of SW21 through SW2n in the second selector switch of SW21.

FIG. 11 is a timing chart of the operation of the structures of FIGS. 8 through 10. In FIG. 11, SDST is a start signal to the shift register; SDCK is a clock signal; XDISC is a reset signal. SDST, SDCK and XDISC are commonly supplied to the upper shift register USR and the lower shift register BSR. Since XDISC is the state of High, the shift register is in a state of operation. In FIG. 11, the display period dt and the touch panel operation period tt are the same.

In FIG. 11, when the start signal SDST is applied to the upper shift register USR, the upper shift register unit SR31 begins to work, then the gate voltage Vug1 is supplied to the switch SW31 from the output terminal of the upper shift register unit SR31. Since the switch SW31 is constituted by N type TFT, the switch SW31 becomes OFF when the gate signal Vug1 is Low; consequently, the common voltage Vcom from the upper side of the screen is cut off. By the way, the signal Vug1 is simultaneously applied to the input terminal of the shift register unit SR32.

On the other hand, when the start signal SDST is applied to the lower shift register BSR, the lower shift register unit SR21 begins to work, then the signal High is supplied to the lower switch SW21. Since the lower switch SW21 is constituted by the structure as shown in FIG. 7, the common voltage Vcom is cut off when the gate signal is High; consequently, the Tx signal for the touch panel is applied to the electrode Tx1. In the meantime, the signal Vbg1 is simultaneously supplied to the input terminal of the shift register SR22.

Supplying Low pulse to the upper switch SW3 from the upper shift register USR and supplying High pulse to the lower switch SW2 from the lower shift register BSR are made simultaneously. After supplying Low pulse from the upper shift register USR and supplying High pulse from the lower shift register BSR are completed; the subsequent clock period is for a image display period, in which the common voltage Vcom is applied to all the electrodes Tx1 through Txn.

During the voltage for the touch panel is applied to the electrode Tx1, the common voltage Vcom is applied to the electrodes Tx2 through Txn from both of the upper side and the lower side of the screen. Namely, in the present invention, since the common voltage Vcom is applied from the upper side of the screen and the lower side of the screen to the electrodes other than the electrode Tx1, a gradation of brightness or a gradation of contrast in the screen can be avoided.

After the images are displayed for a certain period, when the next clock signal is applied to the upper shift register USR and the lower shift register BSR, the same operation is made in the electrode Tx2, and the touch panel voltage is applied to the electrode Tx2. In this time, too, the common voltage Vcom is applied to all the Tx electrodes except the electrode Tx2. In the function of FIG. 11, each of the Tx electrodes is selected once or more times in one frame period.

FIG. 11 is an example that one frame period is divided into the display period dt and the touch panel operation period tt where tt:td=1:1. The present invention, however, is operable in a condition that e.g. the display period is ⅔ and the touch panel operation period is ⅓, and the like. Further, the present invention is operable even in the case that one frame is divided into three or more periods.

Figure 12:
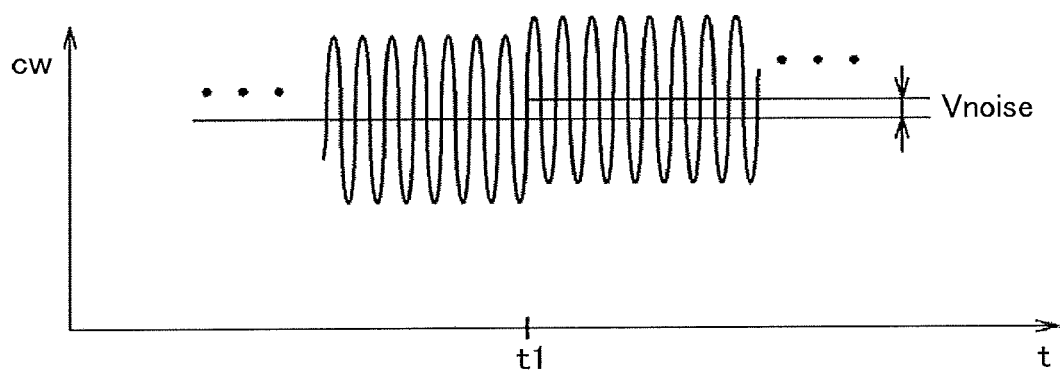
FIG. 12 is an example of the signal of the NFC according to the present invention.

FIG. 12 is the figure that shows the effect of the present invention. The abscissa t and the ordinate cw of FIG. 12 are the same as explained in FIG. 6. Namely, the sin wave in FIG. 12 is a carrier wave cw for the NFC signal; the frequency of the carrier wave is e.g. 13.56 MHz. In FIG. 12, the ordinate is a value of the carrier wave cw; the abscissa is the time t. When the common voltage Vcom is cut off from each of the Tx electrodes by the third selecting switch sw3 at the time t1, the noise of Vnoise is generated, the carrier wave is modulated by the noise of Vnoise. In the present invention, however, the source of the noise is the switching circuit corresponding to the only one Tx electrode. In other words, the noise due to the switching in Vcom is 1/n in FIG. 12 compared with the noise in FIG. 6. Therefore, as depicted in FIG. 12, the malfunction of the NFC can be avoided since the modulation due to the noise in the carrier wave can be smaller in the present invention.

Furthermore, as depicted in FIG. 2, the antenna for the NFC is located at the side opposite to the terminal area 30 of the liquid crystal display device. In such a case, if the switches of the voltages for the Tx electrodes are located at the side opposite to the terminal area 30, the influence to the wave for the NFC is more serious. At this point, the present invention is further effective since the present invention can counter measure the noise generated at the switches of the voltages for the Tx electrodes, which are located at the side opposite to the terminal area 30.

In the meantime, in the touch panel operation, the common voltage Vcom is applied to all the electrodes Tx except the electrode Tx that the voltage for the touch panel operation is applied. Further, the common voltage Vcom is applied from the upper side and the lower side of the screen in the present invention; thus, a gradation of the common voltage Vcom can be avoided, consequently, the gradation of the contrast can be avoided.

The N type TFT and the P type TFT can be interchangeable as well as the combination of the N type TFT and the P type TFT. For example, it is possible to make SW1 by P type, SW2n-1 by P type, SW2n-2 by N type and SW3 by P type. In this case, the wave form of the timing chart in FIG. 11 is reversed.

In the above explanations, the present invention has been explained in regard to the liquid crystal display device. The present invention, however, is applicable to the organic EL display device. Namely, the touch panel function can be installed in the organic EL display device, too. For example, the cathode is generally formed in common in all the pixels; however, the cathode can be divided to form the Tx electrodes, which work as the electrodes of one side of the touch panel, namely, e.g. as Tx electrodes.

In such a case, either one of the cathode voltage for the image display or the voltage for the touch panel operation can be applied by timely switching to each of the electrodes formed by dividing cathode. When the NFC function is installed in such an organic EL display device, the same problem as explained in the liquid crystal display device arises. Therefore, the malfunction of the organic EL display device, in which the touch panel function and the NFC function are installed, can be avoided by applying the structure of the present invention explained above.

What is claimed is:

1. A display device having a Near Field Communication (NFC) function and a display panel installed with touch panel function comprising:
   a plurality of display electrodes are formed in a display area of the display panel,
   a first circuit having a plurality of first switches for changing between a voltage for an image display and for a touch panel operation formed at a first side of the display area,
   a second circuit having a plurality of second switches for changing between applying the voltage for the image display and not applying the voltage for the image display at a second side opposite to the first side of the display area,
   the first circuit selects one of the plurality of display electrodes successively, applying the voltage for the touch panel operation to a selected display electrode and applying the voltage for the image display to the plurality of display electrodes other than the selected display electrode,
   the second circuit selects one of the plurality of display electrodes successively, and not applying the voltage for the image display to the selected display electrode.

2. The display device according to claim 1,
   wherein one frame period is divided into a period for the image display and a period of for the touch panel operation,
   a successive selection of the plurality of display electrodes by the first circuit or by the second circuit is operated during the touch panel operation.

3. The display device according to claim 1,
   wherein each of the first switches connects with each of the display electrodes,
   each of the second switches connects with each of the display electrodes,
   a first switch and a second switch that connect with a same display electrode execute a switching operation in a same timing.

4. The display device according to claim 2,
   wherein a number of the plurality of display electrodes is n, provided n is an integer, the voltage for the touch panel operation is applied to each of the plurality of display electrodes once or in plural times in one frame.

5. The display device according to claim 1,
wherein an antenna for the Near Field Communication function is disposed at a position that overlaps with the second circuit in a plan view.

6. The display device according to claim 5,
wherein an antenna for the Near Field Communication function is located between the display panel and a frame that covers the display panel from underneath.

7. The display device according to claim 1,
wherein control signals for the first circuit are supplied from a first shift register, and
control signals for the second circuit are supplied from a second shift register.

8. The display device according to claim 1,
wherein the first circuit is set in a vicinity of a terminal area of the display panel.

9. The display device according to claim 1,
wherein the display panel is a liquid crystal display panel, the voltage of the image display is a common voltage.

10. The display device according to claim 1,
wherein the display panel is an organic EL display panel, the voltage of the image display is a cathode voltage.

* * * * *